Patented May 29, 1934

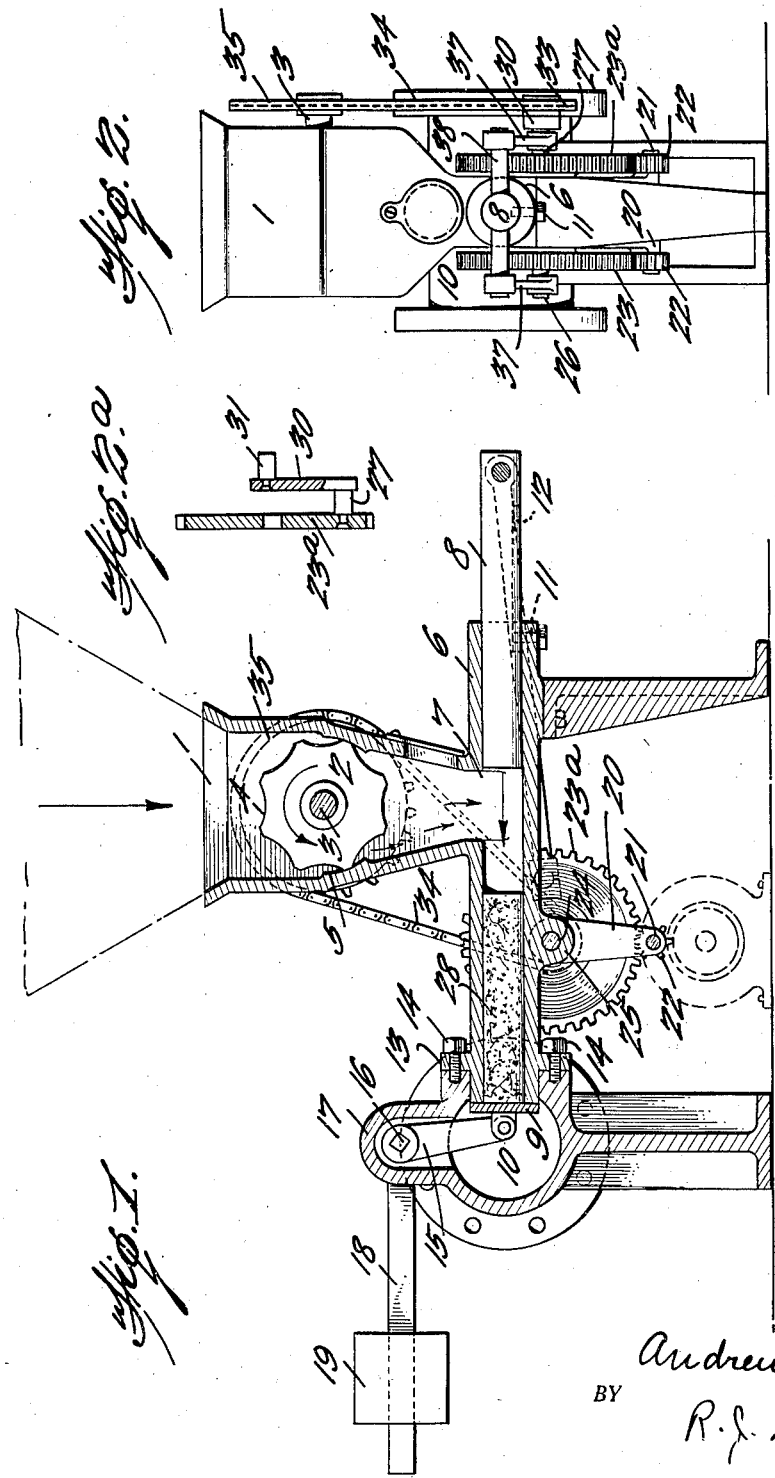

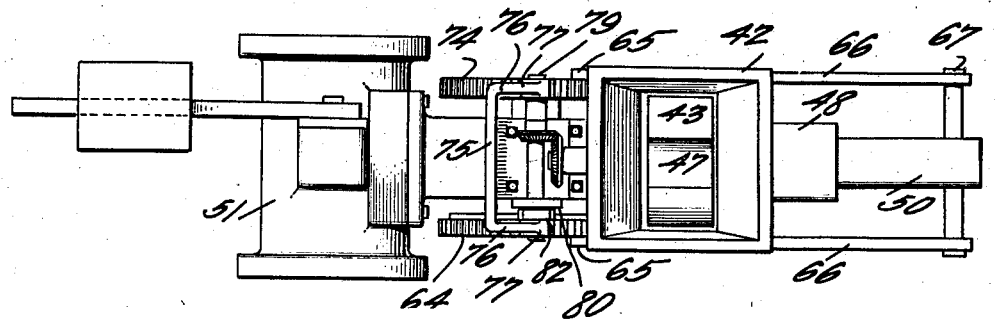
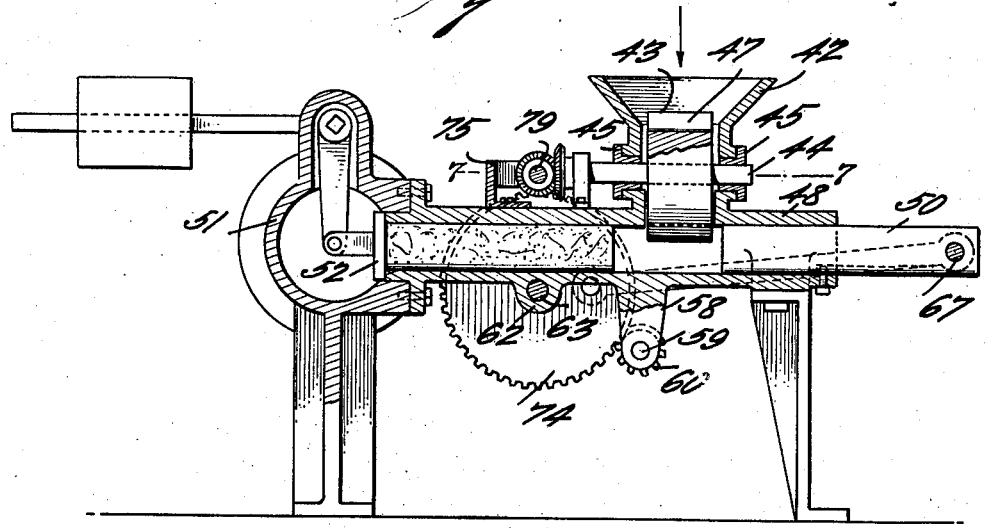
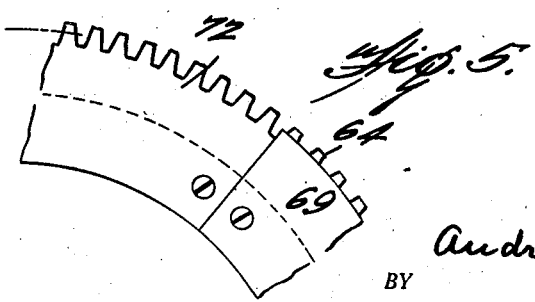

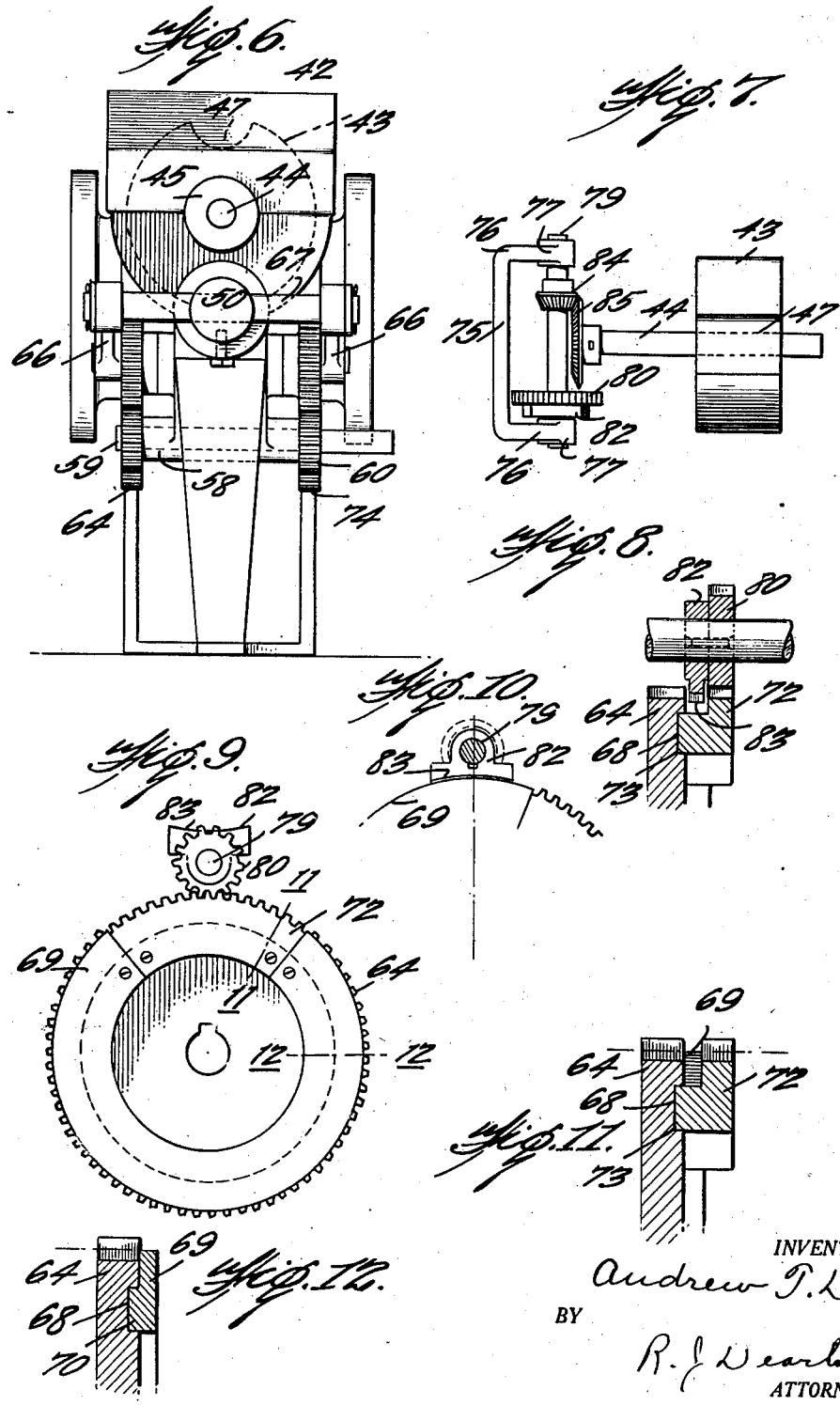

1,960,435

UNITED STATES PATENT OFFICE 1,960,435

PULVEROUS MATERIAL INJECTOR

Andrew T. Dudley, Port Arthur, Tex., assignor to The Texas Company, New York, N. Y., a corporation of Delaware Application June 20, 1928, Serial No. 286,938

2 Claims. (Cl. 196—147)

This invention relates to apparatus for injecting pulverous solid material into vessels or pipes containing liquids.

It is an object of this invention to inject the pulverous solid material into vessels or pipes containing liquids under substantial pressure without permitting escape of the liquid from the vessel.

Another object of the invention is to provide an apparatus which will automatically measure a predetermined quantity of pulverous material and inject the measured quantity into a liquid flowing under pressure.

A further object of the invention is to provide an apparatus which will inject a series of successive charges of material of predetermined bulk into a liquid flowing under pressure within a pipe.

This apparatus is especially intended for continuously charging quantities of material, such as fuller's earth, into a pipe line in which petroleum oil is flowing under high pressure for the purpose of treating the oil with a fixed proportion of the material.

Other objects and advantages will become apparent from the detailed description of the apparatus illustrating this invention which follows:

In the drawings illustrating the preferred embodiments of the invention, Fig. 1 is a side sectional view;

Fig. 2 is an end view of the apparatus shown in Fig. 1.

Fig. 2a shows a detail of the drive mechanism of the apparatus shown in Figs. 1 and 2;

Fig. 3 is a plan view of a modified form of the invention;

Fig. 4 is a side elevational view of the modified form shown in Fig. 3;

Fig. 5 shows a detail of the modification;

Fig. 6 is an end view of the modification shown in Figs. 3 and 4;

Figs. 7, 9, and 10 show details of the drive mechanism of the measuring device; and Figs. 8, 11 and 12 are sectional views of details of the drive mechanism of the measuring device.

Referring to Figs. 1 and 2 of the drawings, the numeral 1 refers to a feed hopper having a flaring upper end into which the discharge chute of a storage bin may fit. A feed roll 2 is mounted upon the shaft 3 within the hopper 1. As shown, the feed roll 2 is provided with a plurality of measuring concavities or recesses 4 formed on its face. The roll 2, in operation, is rotated by suitable mechanism to be described hereinafter, and the concavities 4 cooperate with raised portions 5 on the inner surface of the hopper 1 to measure quantities of pulverous solid material contained in the hopper 1 and allow the same to pass by the roll 2. The contour of the roll, by reason of the concavities, also serves to some extent to agitate and stir the pulverous material in the upper part of the hopper 1 and thus insure a proper feed.

The hopper 1 is supported upon a cylinder or tube 6 intermediate the ends thereof. The cylinder 6 is formed with an opening 7 through which the measured quantities of material from the hopper 1 may pass into the cylinder. One end of the cylinder 6 projects into a chamber 10 which may constitute a short section of a pipe line through which a liquid, such as petroleum oil under considerable pressure, is flowing. The cylinder is provided with an annular flange 13 through which stud bolts 14 project into the wall of chamber 10 to hold the chamber and cylinder in assembled relation.

A plunger or piston 8 is slidably mounted within the cylinder 6 for the purpose of forcing the material longitudinally of the cylinder and through a check valve 9 into the chamber 10. The diameter of the piston 8 is such as to closely fit the bore of the cylinder, and the piston is held against rotation by a pin 11 which passes through the wall of the cylinder and projects into a longitudinal groove 12 in the piston. The travel of the piston 8 is preferably less than the length of the cylinder 6, and its working stroke is arrested a substantial distance from the check valve 9. Thus, a considerable quantity of the pulverous material is packed within the cylinder adjacent the valve 9, as indicated by numeral 28, Fig. 1.

Each time the piston 8 moves forward, a measured quantity of material which has been dropped into the cylinder from the hopper 1 is moved to the left as shown in Fig. 1 against material previously measured and advanced in the cylinder. At the beginning of the operation of the machine and after a sufficient quantity of the pulverous material has been received in the cylinder, the entire mass of packed material is pushed longitudinally of the cylinder 6 against the weighted valve 9, forcing it open and depositing in the chamber 10 a quantity of material substantially equal to the quantity last received from the measuring device. The material deposited in chamber 10 is immediately caught by the stream of liquid flowing therein and carried along to a suitable receptacle or container which forms no part of the present invention. When the valve 9 is open, the packed material 28 prevents the liquid from flowing into the cylinder 6.

The valve 9 may be any suitable type of check valve which is normally closed, but which opens under sufficient force applied from the piston side. In the illustrated form, the valve 9 is mounted upon the end of a rocker arm 15 in such position as to seat upon the end of the cylinder 6, which latter projects slightly within the chamber 10. The other end of the rocker arm 15 is fixedly secured upon a rotatable shaft 16 which passes through the wall of a dome 17 formed upon the chamber 10. A beam 18 having a weight 19 adjustable therealong is secured upon the shaft 16 outside of the dome 17. By this mechanism the valve is yieldably and adjustably held in closed position, thus normally preventing oil passing from the chamber 10 to the cylinder 6 but permitting the solid material to be forced into the chamber from the cylinder.

The mechanism for operating the measuring roll 2 and the piston 8 will now be described.

A pair of brackets 20, 20, with bearings for a shaft 21 formed in their lower ends, projects downwardly from the cylinder 6. Upon either end of this shaft 21, small gear wheels 22, 22 are secured. These wheels 22 are driven by any suitable means, such as the electric motor illustrated in Fig. 1. Gear wheels 23, 23a are fixedly secured upon a shaft 24 journaled in a bearing 25 formed on the under side of the cylinder 6. The gear wheels 23, 23a are in mesh with gear wheels 22 and are driven thereby.

A crank stud or pin 26 projects from the outer face of wheel 23. In a similar position on wheel 23a is a crank stud 27. The stud 27 has an arm 30 (see Fig. 2a) at right angles thereto and extending to the center of the gear wheel 23a parallel with the outer face thereof. On the end of the arm 30 and in alignment with the axis of wheel 23a is a stud shaft 31. A sprocket wheel 33 is secured upon this stud shaft so as to be turned thereby. The sprocket wheel 33 drives a chain 34 which turns a sprocket wheel 35 mounted on feed-roll shaft 3 carrying the feed roll 2 as described above.

The piston 8 is also reciprocated by the above described driving elements through two connecting rods 37 engaging the studs 26 and 27 on the gear wheels 23 and 23a. The outer ends of these rods 37 are secured to a rod 38 which passes through the outer end of piston 8.

It will be apparent that a reciprocatory movement is given to the piston 8 and a rotary motion given to feed roll 2. There is a definite relationship between the movements of the feed roll and piston, so that each time the piston moves forward, the feed roll will have deposited the same amount of material from the hopper in front of the piston and a substantially equal amount will be forced through valve 9 into the liquid in chamber 10. The feeding action is therefore constant and uniform, even where the material being fed is finely divided and tends to become packed together.

A modified form of the invention is shown in Figs. 3 to 12 inclusive, of the drawings. The principal differences in construction between the form of the invention already described and the modified form reside in the drive mechanism and the measuring device.

The apparatus shown in Figs. 3 to 12 comprises a flaring feed hopper 42 adapted to receive pulverous material from the discharge chute of a storage bin. A feed roll 43 is positioned within the lower part of the feed hopper 42 and is mounted upon a rotatable shaft 44 journaled in bearings 45, 45 in the side walls of the feed hopper. The feed roll 43 is provided with one or more concavities or recesses 47 in its periphery. In the drawings two such concavities are illustrated but any practical number may be provided.

The feed hopper is mounted upon a cylinder or tubular portion 48 which has an opening in its upper wall through which pulverous material from the hopper is fed and through which the feed roll 43 projects into the cylinder. A piston 50 is disposed within the cylinder 48 and is reciprocated by mechanism presently to be described. The travel of the piston is less than the length of the cylinder 48 and consequently, the material deposited in the cylinder by the feed roll 43 is packed adjacent one end of the cylinder, as shown in Fig. 4. The concavities 47 formed in the feed roll 43 fit the piston 50 and as the piston moves to the left, in Fig. 4, it passes through the concavity that is in registry therewith.

During the time that the piston 50 is clear of the feed roll, as shown in Fig. 4, the feed roll is rotated so as to bring the other concavity to the lower position and in alignment with the piston. The feed roll is then stopped and is held locked in this position while the piston reciprocates and until the latter has returned to a position clear of the feed roll. Since the concavities 47 are of the same capacity, each time one of the concavities is brought to the lower position an equal amount of material is deposited in the cylinder 48.

At the opposite end of the cylinder from the piston 50 is located a vessel or chamber 51 the connection being controlled by a check valve 52. This portion of the apparatus may be of substantially the same construction as that shown and described above in connection with Figs. 1 and 2.

Depending from the under side of the cylinder 48 is a bearing support 58, rotatably supporting a shaft 59 on which are disposed the pinions 60. The pinions 60 are continuously driven from any suitable mechanism. A bearing 62 on the under side of the cylinder 48 is provided for a shaft 63. On one end of the shaft 63 is a gear wheel 64 and on the other end is a gear wheel 74. These wheels are driven by the pinions 60.

Upon the outer faces of gear wheels 64 and 74 are eccentrically positioned crank studs or pins 65. These crank studs are connected through rods 66 with a pin 67 which passes through one end of the piston 50 to provide a reciprocatory movement of the piston as the gear wheels 64 and 74 rotate.

The mechanism for intermittently driving the feed roll 43 will now be described.

Upon the inner face of gear wheel 64, there is an annular groove 68 (see Figs. 8, 11, and 12). A broken ring track member 69, (see Figs. 5, 9, and 10) having an outside radius substantially equal to the radius of the pitch line of the teeth on gear wheel 64, is secured to the gear wheel 64. The track member 69 has a thickened portion 70 lying in the groove 68 of gear wheel 64, and the track member is held flat against the side of gear wheel 64, as is clearly shown in Figs. 9 and 12. The ring track member 69 is not a complete annulus and extends only part of the way around the gear 64. In the embodiment shown, the track member extends slightly more than three fourths of the circumference of the gear wheel.

Between the ends of ring track 69, a gear segment 72 is positioned (see Figs. 8 and 11). This segment 72 has a thickened portion 73 which lies in the groove 68 of the gear wheel 64 and is held in position adjacent the gear wheel 64 by any suitable means. The portion 73 is preferably of such thickness that the gear segment 72 is held spaced from the gear wheel a distance as great as the total thickness of ring track 69, as is clearly shown in Fig. 11. It will be apparent that a substantial cavity is formed between the gear wheel 64, gear segment 72 and the ends of ring track 69, the purpose of which will presently appear.

Upon the upper side of the cylinder 48 is bolted a bracket 75 (see Figs. 3 and 4) which has a pair of parallel arms 76, 76. The ends of these arms are formed as bearings 77, 77, and a shaft 79 is rotatably supported thereby. A small gear wheel 80 upon the shaft 79 is positioned to mesh with the gear segment 72 when the latter is in its upper position. Thus each time the gear wheel 64 makes one revolution, the gear segment 72 engages the gear wheel 80 causing it and the shaft 79 to make one revolution.

An interlocking member 82 is mounted upon the shaft 79 and secured to the gear wheel 80. (See Figs. 7, 8, 9, and 10). The member 82 has a flange portion with a concave outer face 83 corresponding in curvature to the curvature of the periphery of the ring track 69. The locking member 82 is positioned adjacent the ring track 69 and when a portion of the track member is upward, it is closely engaged by the curved surface 83 of the locking member, as shown in Fig. 10, said surface sliding along the track and thereby preventing any rotation of the shaft 79 upon which the locking member is mounted.

However, when gear segment 72 is upward, as shown in Fig. 9, and engaged with gear wheel 80, the member 82 does not interfere with the rotation of shaft 79, since the cooperating track is discontinued adjacent the gear segment 72. The locking member 82 rotates with the shaft 79 and gear 80, this motion being allowed by the cavity between the wheel 64, gear segment 72 and the ends of ring track member 69. At the instant the gear segment 72 clears the gear wheel 80, the locking member returns into engagement with track 69, and holds the shaft 79 against movement until the gear segment 72 again engages the gear 80.

The shaft 79, having an intermittent movement, imparts an intermittent movement to feed roll 43 through the bevel gears 84 and 85. The relative sizes of the bevel gears 84 and 85 are such as to impart one-half a revolution to feed roll 43 for each complete revolution of shaft 79.

In operation, pulverous material such as fuller's earth is deposited in the feed hopper 42. The piston 50 being in its backward position and clear of feed roll 43, the feed roll is rotated 180°, thereby causing the concavity 47 which was at the top to be brought to the bottom, carrying with it a quantity of pulverous material which is deposited in cylinder 48. The piston 50 then moves forward in the cylinder 48 through the recess 47 in the feed roll, pushing the freshly deposited material against the packed mass of material already in the cylinder and moving the entire mass a distance sufficient to make room for the added material. With each forward movement of the piston, a quantity of material equal to the added quantity is pushed through the check valve 52 into vessel 51 where it is carried away and mixed with the petroleum or other liquid under pressure flowing therethrough. The piston 50 is then withdrawn, allowing the valve 52 to close to prevent loss of liquid from the vessel 51. The cycle of operation is then repeated. During the time that the valve 52 is in open position, the closely packed mass of material in the cylinder 48 adjacent the valve prevents the liquid from flowing into the cylinder.

It will be apparent that the apparatus embodying the invention described above is well adapted for the intended purpose and may be employed for feeding finely divided treating material into a fluid, such as oil, flowing through a pipe line under considerable pressure. It is not limited, however, to such use, nor is the scope of the invention limited to the detailed constructions shown and described, being defined by the appended claims.

I claim:

1. In a pulverous material charging device, a vessel containing fluid under pressure, a cylinder communicating with the vessel, a piston reciprocating within the cylinder, a feed hopper opening into the cylinder in front of the piston when the latter is retracted, a feed roll having concavities formed in its face positioned in the feed hopper adjacent the opening into the cylinder, and means for intermittently rotating the feed roll in synchronism with the reciprocation of said piston comprising a rotatable wheel, a broken ring track secured thereto, a gear segment secured to said wheel and positioned adjacent the gap in said broken ring track, a shaft substantially parallel with the axis of said wheel, a gear wheel fixed on said shaft in position to mesh with the gear segment, a locking member fixed on said shaft in position to cooperate with the track and prevent rotation of the shaft, whereby the rotary motion of the first mentioned wheel imparts an intermittent rotation to the shaft.

2. In a pulverous material charging device, a vessel containing fluid under pressure, a cylinder communicating with the vessel, a piston reciprocating within the cylinder, a feed hopper opening into the cylinder in front of the piston when the latter is retracted, a feed roll having concavities formed in its face positioned in the feed hopper adjacent the opening into the cylinder, said concavities having the same cross sectional shape as said piston and the axis of said concavities being parallel to the axis of said roll, and means for rotating said feed roll.

ANDREW T. DUDLEY.